United States Patent [19]

Hatori et al.

[11] Patent Number: 5,377,293
[45] Date of Patent: Dec. 27, 1994

[54] OPTICAL FIBER HAVING MULTI-COMPONENT CORE GLASS OR A PLASTIC CORE, AND A COATING LAYER

[75] Inventors: Tsuruo Hatori, Sagamihara; Akira Satoh, Tokyo; Shigeharu Suzuki, Tokyo; Yoshinobu Akimoto, Tokyo, all of Japan

[73] Assignee: Olympus Optical Co., Ltd., Tokyo, Japan

[21] Appl. No.: 83,992

[22] Filed: Jun. 28, 1993

[30] Foreign Application Priority Data

Oct. 8, 1992 [JP] Japan .................................. 4-270604
Dec. 10, 1992 [JP] Japan .................................. 4-330609

[51] Int. Cl.⁵ .............................................. G02B 6/22
[52] U.S. Cl. .................................. 385/128; 385/117; 385/127; 385/141; 385/142; 385/143
[58] Field of Search ............... 385/117, 118, 126, 127, 385/128, 141, 142, 143, 144, 145; 362/32; 359/389, 388, 385

[56] References Cited

U.S. PATENT DOCUMENTS

| | | | |
|---|---|---|---|
| 4,094,606 | 1/1978 | Camphausen | 385/2 |
| 4,243,299 | 1/1981 | Glieremoth et al. | 385/127 |
| 4,279,465 | 7/1981 | Vojvodich | 385/127 |
| 4,472,021 | 9/1984 | Ansel et al. | 385/128 |
| 4,505,542 | 3/1985 | Clarke | 385/127 |
| 4,614,411 | 9/1986 | Horenz | 359/389 |
| 4,735,483 | 4/1988 | Kuroiwa et al. | 385/117 |
| 4,783,135 | 11/1988 | Utsumi et al. | 385/123 |
| 4,798,445 | 1/1989 | Yamamoto et al. | 385/128 |
| 5,015,068 | 5/1991 | Petisce | 385/123 |

*Primary Examiner*—Frank Gonzalez
*Attorney, Agent, or Firm*—Frishauf, Holtz, Goodman & Woodward

[57] ABSTRACT

An optical fiber includes an optical fiber element having a core layer and a cladding layer formed on the core layer, and a coating layer having a refractive index lower than at least the refractive index of the cladding layer, or a coating layer including at least one of a predetermined saturated higher fatty acid and alkyl-polysiloxane.

10 Claims, 3 Drawing Sheets

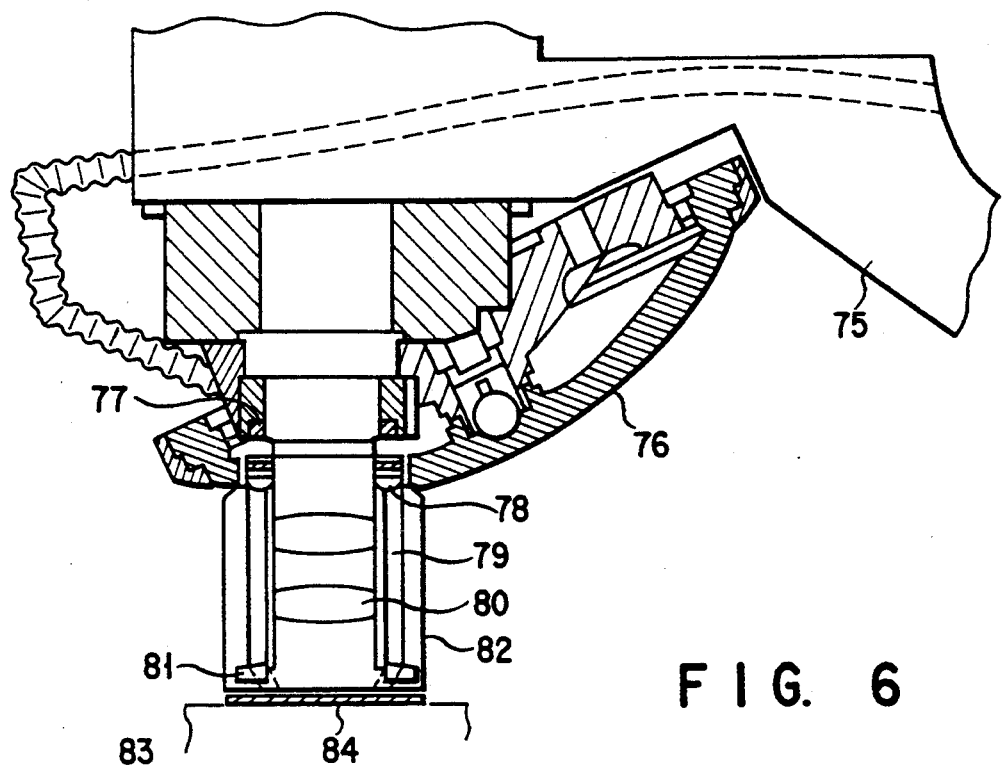
F I G. 6
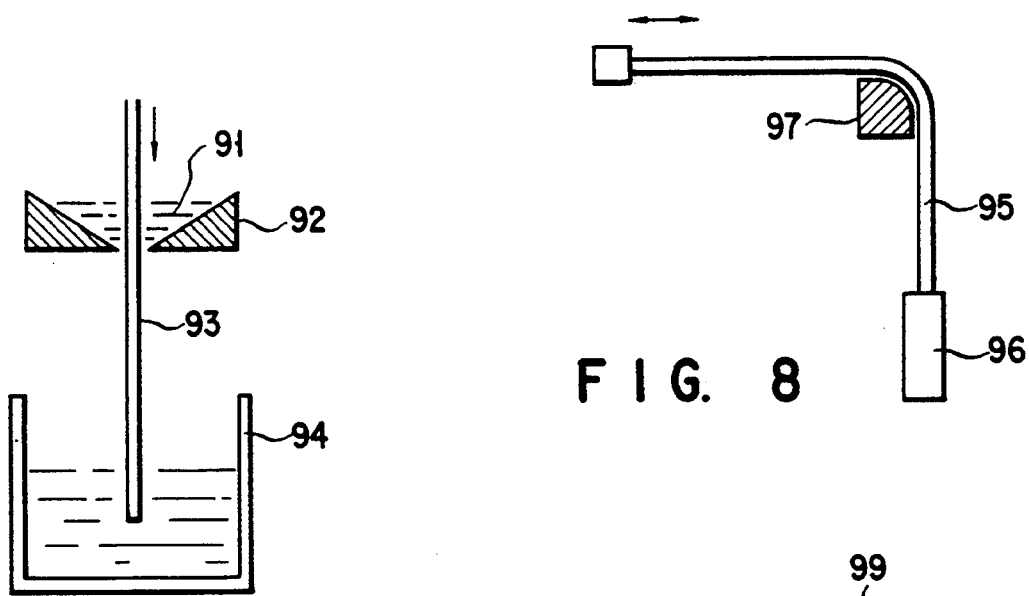
F I G. 7
F I G. 8
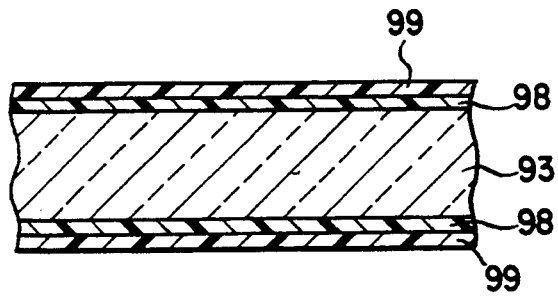
F I G. 9

OPTICAL FIBER HAVING MULTI-COMPONENT CORE GLASS OR A PLASTIC CORE, AND A COATING LAYER

BACKGROUND OF THE INVENTION

1. Field of the Invention

The present invention relates to an optical fiber and, more particularly, to an optical fiber arranged in the insertion section of an endoscope or the light-transmitting portion of a camera to transmit illumination light to an object under test.

2. Description of the Related Art

A light guide fiber bundle is generally inserted inside the insertion section of an endoscope to transmit illumination light to a distal end constituent portion of the insertion section. The light guide fiber bundle is guided to a connector through a universal cord connected to the operation section of the endoscope, and an incident end is formed in the connector to receive illumination light.

The connector is connected to a light source unit. The illumination light emitted from a light source is transmitted from the incident end to the light guide fiber bundle and emerges from an exit end serving as an illumination window formed in the distal end constituent portion of the insertion section.

The light guide fiber bundle is constituted by bundling a plurality of light guide fiber elements each having a two-layered structure consisting of a core layer and a cladding layer. A method of coating $MoS_2$ (molybdenum sulfide) as a solid lubricant is known to reduce friction between the fiber elements and prevent the fiber elements from being broken.

The illumination light is totally reflected by an interface between the core layer and the cladding layer and is then transmitted to the distal end constituent portion of the insertion section of the endoscope through the core layer. Due to micro disorders at the interface between the core layer and the cladding layer, the illumination light partially passes through the interface and enters the cladding layer. The illumination light passing into the cladding layer is incident on and absorbed by $MoS_2$ coated on the surface of each light guide fiber element. That is, the illumination light incident on the light guide fiber bundle is partially absorbed and attenuated by $MoS_2$, and the attenuated light is optically transmitted to the distal end constituent portion of the insertion section.

As described above, if $MoS_2$ is coated on the surface of each light guide fiber element to prevent friction between the fiber elements and damage to the fiber elements, light passing into the cladding layer (i.e., cladding mode light) is discarded outside the fiber element, i.e., valuable illumination light is partially wasted. To obtain a sufficient amount of illumination light, therefore, the number of fiber elements must be increased. As a result, the diameter of the insertion section undesirably increases.

when the glass fiber bundle coated with $MoS_2$ is subjected to a continuous friction test upon a humidity resistance test, $MoS_2$ layers stick to each other, and the glass fiber bundle tends to break. Even in a glass fiber bundle not coated with $MoS_2$, a humidity resistance test causes burning, and the glass fiber bundle tends to break. The glass fiber bundle coated with $MoS_2$ tends to be contaminated because the $MoS_2$ layer consists of black grains.

SUMMARY OF THE INVENTION

It is an object of the present invention to return and guide, into a core layer again, light having passed into a cladding layer through an interface between the core layer and the cladding layer, thereby optically transmitting the light, and to obtain a sufficiently large amount of light in a small sectional area.

It is another object of the present invention to form a coating layer including at least one of a saturated higher fatty acid and alkylpolysiloxane on the surface of a fiber element, thereby preventing contamination and breaking.

According to the present invention, there is provided an optical fiber comprising an optical fiber element having a core layer and a cladding layer formed on the core layer, and a coating layer formed on the optical fiber element and having a refractive index lower than at least that of the cladding layer.

According to the present invention, there is also provided an optical fiber, disposed in an insertion section of an endoscope to transmit illumination light, comprising an optical fiber element having a core layer and a cladding layer formed on the core layer, and a coating layer formed on the optical fiber element and having a refractive index lower than at least that of the cladding layer.

According to the present invention, there is further provided an optical fiber comprising an optical fiber element having a core layer and a cladding layer formed on the core layer, and a coating layer formed on the optical fiber element and including at least one of a saturated fatty acid represented by formula (1) and alkylpolysiloxane represented by [Formula 1]:

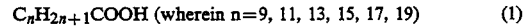

$$C_nH_{2n+1}COOH \text{ (wherein } n=9, 11, 13, 15, 17, 19) \quad (1)$$

[Formula 2]

wherein n is an integer of 1 or more, $R_1$ represents a lower alkyl group having 1 to 7 carbon atoms, and $R_2$ represents a hydrogen atom, a lower alkyl group having 1 to 7 carbon atoms or an aryl group having about 6 carbon atoms.

According to the present invention, the coating layer including a saturated higher fatty acid in place of $MoS_2$ is formed on the optical fiber element to minimize the contamination and breaking after a humidity resistance test. When the coating layer made of alkylpolysiloxane represented by [Formula I] is formed, heat resistance and heat-and-humidity resistance, and humidity resistance can be improved, thereby greatly minimizing breaking. In addition, when a colorant is added to the saturated fatty acid, formation of the coating agent layer can be visually confirmed by the color of the colorant.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is an enlarged view of the main part in FIG. 5;

FIG. 7 is a view for explaining a die-coated state of a glass fiber according to Example 2 of the present invention;

FIG. 8 is a view for explaining a continuous wear test of a glass fiber according to Example 3 of the present invention; and FIG. 9 is a schematic sectional view of a glass fiber according to still another example of the present invention.

DETAILED DESCRIPTION OF THE PREFERRED EMBODIMENT

A means for forming a coating layer on an optical fiber element according to the present invention is die coating, dipping, or showering.

According to the present invention, an optical fiber may be an optical fiber element bundle or a single optical fiber element.

According to the present invention, the thickness of a coating layer formed on an optical fiber element is preferably about 0.1 μm to increase a packing.

According to the present invention, if the refractive indices of the core layer, the cladding layer, and the coating layer are defined as $n_1$, $n_2$, and $n_3$, respectively, condition $n_1 > n_2 > n_3$ is preferably satisfied to prevent leakage of light from the core layer to the outside and to receive external light inside the core layer. If the core layer consists of a multi-component glass material, refractive index $n_1 = 1.53$ to 1.85, refractive index $n_2 = 1.48$ to 1.54, and refractive index $n_3 = 1.40$ to 1.43. If the core layer consists of pure quartz glass, refractive index $n_1 = 1.46$, refractive index $n_2 = 1.40$ to 1.45, and refractive index $n_3 = 1.40$ to 1.43. If the core layer consists of a plastic material, refractive index $n_1 = 1.49$ to 1.59, refractive index $n_2 = 1.39$ to 1.49, and refractive index $n_3 = 1.40$ to 1.43.

According to the present invention, the saturated higher fatty acid is white, but may be added with a colorant to confirm attachment of a coating agent on the surface of the optical fiber. Examples of the colorant are as follows.

(1) Food blue No. 1: benzyl-ethyl-[4'-(4"-(benzylethylamino)-diphenylmethylene)-2',5-cyclohexadienilidene]-ammonium-2''',3,3'''-disodium trisulfonate ($C_{37}H_{34}Na_2N_2O_9S_3$)

(2) Food blue No. 2: 5,5'-indigotin disodium sulfonate ($C_{16}H_8Na_2N_2O_8S_2$)

(3) Food red No. 2: $C_{20}H_{11}Na_3N_2O_{10}S_3$ (4) Food red No. 3: Erythrosine ($C_{20}H_6Na_2O_5I_4$)

(5) Food red No. 102: New Coccine ($C_{20}H_{11}Na_3O_{10}S_3$)

(6) Food red No. 104: Phloxine ($C_{20}H_2Na_2O_5Br_4Cl_4$)

(7) Food red No. 105: $C_{20}H_2Na_2O_5I_4Cl_4$ (8) Food red No. 106: Acid Red ($C_{27}H_{29}NaN_2O_7S_2$)

(9) Food yellow No. 4: Tartrazine ($C_{16}H_9Na_3N_4O_9S_2$)

(10) Food yellow No. 5: 1-phenylazo-2-naphthol-4',6-disodium disulfonate ($C_{16}H_{10}Na_2N_2O_7S_2$)

(11) Food green No. 3: benzyl-ethyl-[4'-(4''-benzylethylamono)-4'''-oxinediphenylmethelylene)-2',5'-cyclohexadienilidene]-ammonium-3,3''',3'''-di sodium trisulfonate ($C_{37}H_{34}N_2Na_2O_{10}S_3$)

DETAILED DESCRIPTION OF THE PREFERRED EMBODIMENTS

(EXAMPLE 1)

Example 1 of the present invention will be described with reference to FIGS. 1 to 3.

Figure 3:
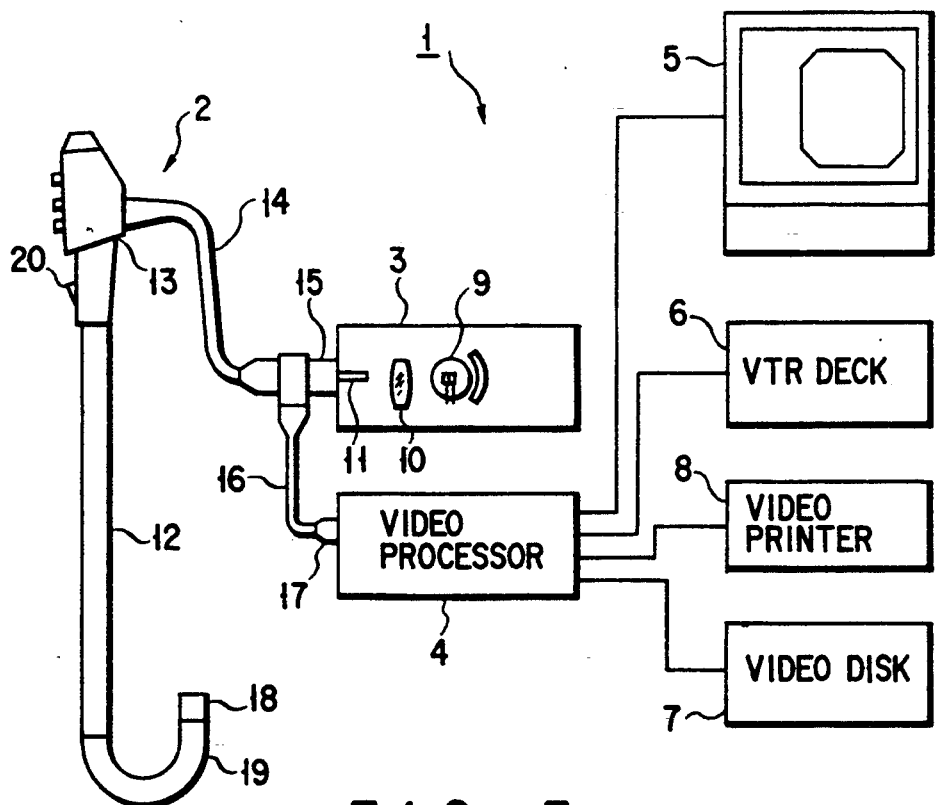
FIG. 3 is a view for explaining an electronic endoscope apparatus according to Example 1.

FIG. 3 shows the overall structure of an electronic endoscope apparatus 1. The electronic endoscope apparatus 1 comprises an electronic endoscope 2 having an image pickup means, a light source unit 3 for supplying illumination light to the electronic endoscope 2, a video processor 4 for performing signal processing corresponding to the electronic endoscope 2, a monitor 5 for displaying a video signal output from the video processor 4, a VTR deck 6 and a video disk 7, connected to the video processor 4, for recording, e.g., a video signal, and a video printer 8 for printing out the video signal as an image. A lamp 9, a condenser lens 10, and a light guide connector 11 are incorporated in the light source unit 3.

The electronic endoscope 2 has an elongated insertion section 12. An operation section 13 having a large width is connected to the proximal end of the insertion section 12. A universal cord 14 extends from the operation section 13. A connector 15 is attached to the distal end of the universal cord 14. When the connector 15 is connected to the light source unit 3, white light from the lamp 9 is focused by the condenser lens 10 and is supplied to the incident end face of the light guide. One connector of a signal cable 16 is connected to the connector 15, and the other connector 17 of the signal cable 16 is connected to the video processor 4. By these connections, a signal picked up by the electronic endoscope 2 is processed to obtain a predetermined video signal. The video signal is then output to, e.g., the monitor 5.

A distal end constituent portion 18 is formed at the distal end of the insertion section 12. A flexible bent portion 19 is formed in a portion connected backward to the distal end constituent portion 18. A bending operation knob (not shown) formed in the operation unit 13 is pivoted to bend the bent portion 19 in four directions.

A treatment tool insertion port 20 for receiving a treatment tool is formed in a front portion of the operation section 13. The treatment tool insertion port 20 communicates with a treatment tool channel (not shown) formed inside the insertion section 12.

An image guide fiber bundle having an objective lens at its distal end, a light guide fiber bundle, and a channel tube (none are shown) are incorporated inside the insertion section 12. The light guide fiber bundle is inserted into the universal cord 14 extending from the operation section 13 and is guided to the connector 15 at the distal end of the universal cord 14. The channel tube communicates with a channel opening (not shown) formed at the distal end of the operation section 13.

Figure 1:
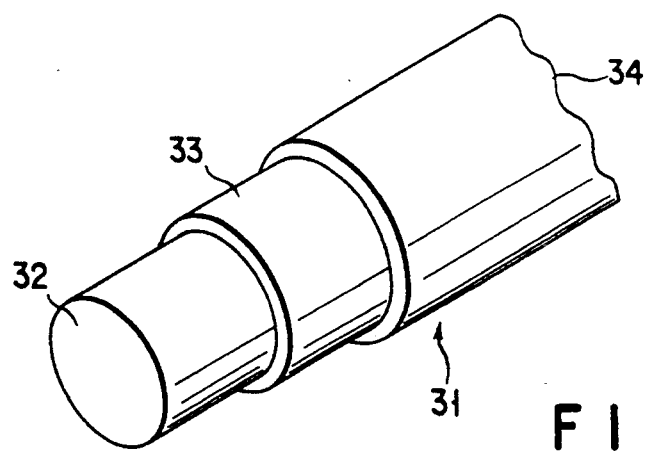
FIG. 1 is a perspective view of a light guide fiber according to Example 1 of the present invention.
Figure 2:
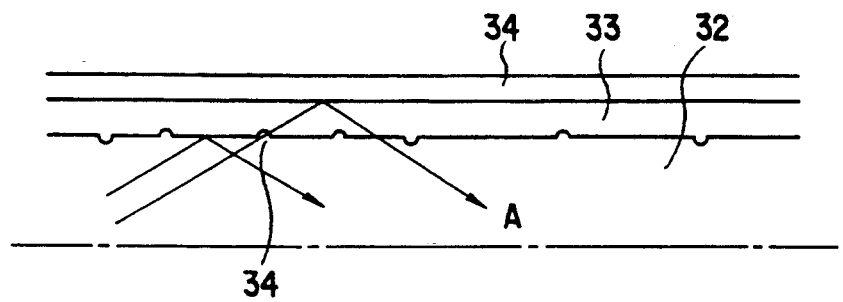
FIG. 2 is a view for explaining a state wherein a light guide fiber element in FIG. 1 is cut in the longitudinal direction.

FIGS. 1 and 2 show a single light guide fiber element 31 constituting the light guide fiber bundle inserted into the insertion section 12. The light guide fiber element 31 comprises a core layer 32 and a cladding layer 33 formed on the core layer 32. The refractive index of the core layer 32 is higher than that of the cladding layer 33. The core layer 32 and the cladding layer 33 may consist of quartz glass or multi-component glass. A coating layer 34 is formed on the cladding layer 33.

The coating layer 34 is a coating layer consisting of at least one of a saturated higher fatty acid or alkyl-polysiloxane. The coating layer 34 consists of, e.g., myristic acid. If the refractive indices of the core layer 32, the cladding layer 33, and the coating layer 34 are defined as $n_1$, $n_2$, and $n_3$, respectively, condition $n_1 > n_2 > n_3$ is satisfied. A means for forming the coating layer 34 may be die coating, dipping, or showering.

The light guide fiber element 31 having the above structure has manufacturing disorders 35 at the interface between the core layer 32 and the cladding layer 33, as shown in FIG. 2. When illumination light A optically transmitted with repeated reflection inside the core layer 32 is incident on the disorders 35, the illumination light A enters the cladding layer 33. However, as the coating layer 34 formed on the cladding layer 33 has a refractive index lower than that of the cladding layer 33, the illumination light A is reflected at the interface between the cladding layer 33 and the coating layer 34 and enters the core layer 32 again. The illumination light is optically transmitted with repeated reflection through the core layer 32. Therefore, light (cladding mode light) which has passed into the cladding layer 33 will not be discarded outside the light guide fiber element 31, unlike in the conventional light guide fiber element. Therefore, the cladding mode light can be used as part of the illumination light.

Myristic acid constituting the coating layer 34 has lubricating properties. Even if a large number of light guide fiber elements 31 are bundled to obtain a light guide fiber bundle, friction between the fiber elements can be minimized, thereby preventing breaking.

The coating layer 34 preferably minimizes attenuation of the illumination light and is transparent. If a resin having no lubricating properties is used to form the coating layer 34, a solid lubricant, i.e., $MoS_2$ may be coated between the light guide fiber elements 31 as in the conventional case.

In Example 1, the light guide fiber elements constituting the light guide fiber bundle are inserted into the insertion section of the electronic endoscope. However, the present invention is not limited to this. For example, the present invention is also applicable when light guide fiber elements are inserted in an insertion section of a surgical microscope in FIG. 4 or a system microscope in FIGS. 5 and 6. The arrangements of these microscopes will be briefly described below.

(A) Surgical Microscope

Figure 4:
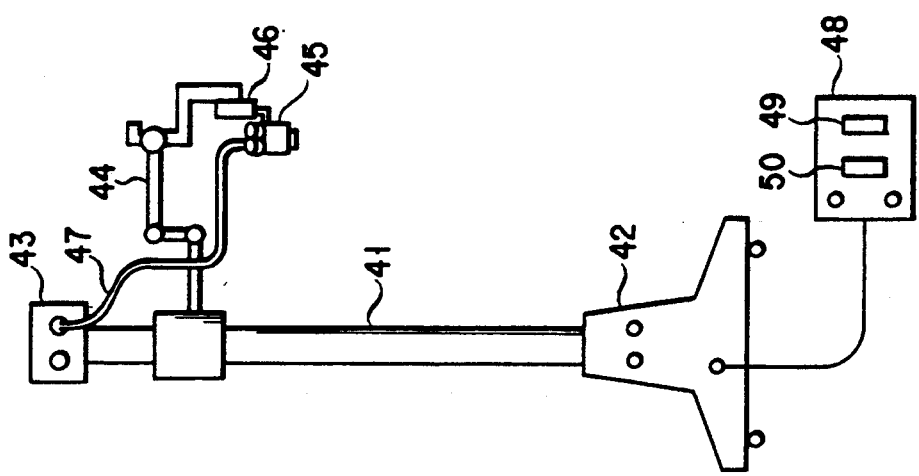
FIG. 4 is a view for explaining a surgical microscope utilizing the light guide fiber.

As shown in FIG. 4, a stand 41 is supported on a support transmission unit 42, and a lamp house 43 is disposed at the top of the stand 41. An arm 44 is attached to the stand 41. A mirror body 45 of the physical microscope is attached to the free end of the arm 44 through a powered sighting unit 46. A light guide 47 is optical connected to the lamp house 43 to guide the illumination light from the lamp house 43 to an illumination optical system (not shown) incorporated in the mirror body 45. A foot switch 48 is electrically connected to the support transmission unit 42. A powered variable magnification unit (not shown) incorporated in the mirror body 45 and the powered sighting unit 46 are operated by the support transmission unit 42 through a control circuit (not shown) incorporated in the support transmission unit 42. See-saw pedal type switches 49 and 50 are arranged in the foot switch 48. The switch 49 has a function of vertically moving the mirror body 45 through the powered sighting unit 46. The switch 50 has a function of performing a variable magnification operation of the mirror body by the powered variable magnification unit. In this manner, by depressing the switches 49 and 50, a sighting operation and a variable magnification operation are performed.

(B) System Microscope

Figure 5:
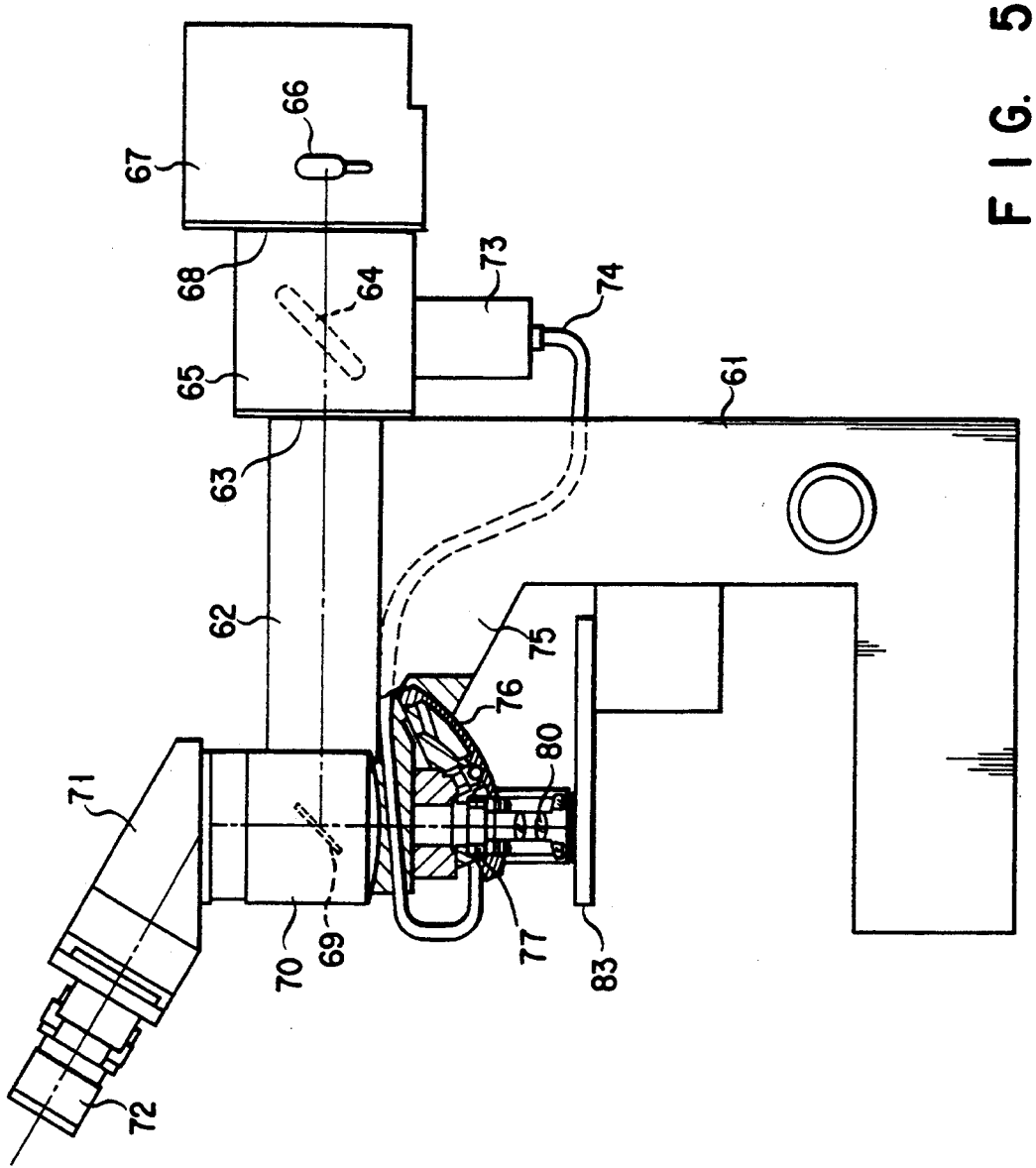
FIG. 5 is a view for explaining a system microscope utilizing the light guide fiber.

As shown in FIGS. 5 and 6, this system microscope comprises a microscope body 61 and a bright-field light-emitting tube 62 arranged on the microscope body 61. A first round dovetail engaging portion 63 is mounted at one end of the bright-field light-emitting tube 62. A bright-field illumination unit 65 incorporating a total reflection mirror 64 is detachably mounted on the engaging portion 63. A lamp house 67 incorporating a lamp 66 is mounted on the bright-field illumination unit 65 through a second round dovetail engaging portion 68.

A lens barrel sleeve 70 having a half mirror 69 therein is connected to the other end of the bright-field light-emitting tube 62. A lens barrel 71 projects upward from the lens barrel sleeve 70. An eyepiece 72 is mounted in the lens barrel 71. An attachment 73 incorporating a condenser lens (not shown) for focusing the illumination light reflected by the total reflection mirror is located below the bright-field illumination unit 65. An optical fiber tube 74 extends from the optical fiber joint portion (not shown) on the lowermost portion of the attachment 73.

An arm portion 75 of the microscope body 61 has a structure in which each revolver can be detachably mounted. A bright/dark-field revolver 76 is detachably mounted on the arm portion 75. A ring-like light source unit 77 is detachably mounted on the bright/dark-field revolver 76. A ring-like lens 78 opposing the ring-like light source unit 77 is mounted in a lower portion of the bright/dark-field revolver 76. An objective lens barrel 82 incorporating a dark-field illumination path 79, a bright/dark-field objective lens 80, and a ring-like condenser lens 81 is arranged at a portion below the bright-/dark-field revolver 76, where the ring-like lens 78 is arranged. Dark-field illumination light is radiated on a sample 84 on a stage 83 by the ring-like condenser lens 81.

(EXAMPLE 2)

0.01 to 10 g/l of food blue No. 1 (colorant) were mixed in an ethanol solution 91 containing myristic acid having a concentration of 1 to 100 g/l, and the resultant solution was die-coated on a glass fiber element 93 passing through a die 92, thereby obtaining a glass fiber having a coating layer consisting of myristic acid, as shown in FIG. 7. Reference numeral 94 denotes a glass fiber take-up unit. An alcohol such as isopropyl alcohol, propanol, or butanol may be used in place of ethanol.

Since the coating layer consisting of myristic acid and the like is formed on the surface of the glass fiber element 93 in Example 2, the fiber element is rarely contaminated as compared with a conventional glass fiber coated with MoS$_2$, and breaking can be greatly minimized. Since food blue No. 1 is contained in an amount of 0.01 to 10 g/l in the ethanol solution 91, formation of the blue coating layer on the glass fiber element 93 can be confirmed by the action of the colorant.

A fiber bundle constituted by the fiber elements thus obtained was tested in a humidity test at 95±5% and 49° C. As compared with the conventional fiber using MoS$_2$, hardening of the fiber bundle hardly occurred. As shown in FIG. 8, one end of a glass fiber bundle 95 was locked using a weight 96 so as to be movable in the right-and-left direction, and a continuous friction test was conducted. 30% of the conventional fibers using MoS$_2$ broke, while only 10% of the fibers in Example 2 broke. Reference numeral 97 in FIG. 6 denotes an SUS rod having a diameter of 10 mm.

In Example 2, food blue No. 1 was used as a colorant. However, the same effect as in Example 2 can be obtained even if other colors such as yellow and red colorants are used.

(EXAMPLE 3)

A glass fiber element was die-coated using an aqueous solution containing 1 to 100 g/l of myristic acid, 20 to 400 g/l of ethanol, and 1 to 50 g/l of a surfactant. The glass fiber element was then heated at 80° C. or more for 10 minutes or more to obtain a glass fiber having a coating layer consisting of myristic acid.

(EXAMPLE 4)

A glass fiber element was dipped in a solution containing 2 to 10 wt % of dimethyl silicone oil represented by [Formula 3] (wherein n is an integer), 90 to 98 wt % of ethanol, and a small amount of methanesulfonic acid. The glass fiber element was then heated at 80° C. or more for 5 minutes or more to obtain a glass fiber.

[Formula 3]

The resultant glass fiber has a structure in which a coating layer consisting of dimethyl silicone oil is formed on the surface of the glass fiber element. When the glass fiber in Example 4 was left in a saturated water vapor at 135° C. and 2 atm for 5 minutes, no degradation was found, and the initial state was maintained. To the contrary, a fiber not subjected to the above treatment was greatly degraded and broke.

(EXAMPLE 5)

A glass fiber element was die-coated using a solution as in Example 4 and was heated at 80° C. or more for 5 minutes or more. The resultant fiber had the same effect as in Example 4.

In each example described above, a coating layer consisting of myristic acid or a coating layer consisting of dimethyl silicone oil is formed on the surface of the glass fiber element. However, the present invention is not limited to this. For example, a coating layer consisting both of myristic acid and dimethyl silicone oil may be formed, as shown in FIG. 9. In this case, a coating layer 98 consisting of dimethyl silicone oil is formed as the first layer on the surface of the glass fiber element, and a second coating layer 99 consisting of myristic acid is formed on the coating layer 98. As a result, the surface of the fiber can be protected by the first coating layer 98, and the lubricating properties can be provided by the second coating layer 99. However, the order of formation of these layers may be reversed, or a layer of a mixture of these materials may be formed.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical fiber comprising:
   an optical fiber element having a core layer and a cladding layer formed on said core layer, said core layer being made of a multi-component glass, said core layer having a refractive index $n_1$ of from 1.53 to 1.85, and said cladding layer having a refractive index $n_2$ of from 1.48 to 1.54; and
   a coating layer formed on said optical fiber element, said coating layer having a refractive index $n_3$ lower than at least the refractive index $n_2$ of said cladding layer, the refractive index $n_3$ of said coating layer being 1.40 to 1.43.

2. An optical fiber according to claim 1, wherein said refractive indices $n_1$, $n_2$, and $n_3$ satisfy a condition $n_1 > n_2 > n_3$.

3. An optical fiber comprising:
   an optical fiber element having a core layer and a cladding layer formed on said core layer, said core layer being made of a plastic material, said core layer having a refractive index $n_1$ of from 1.49 to 1.59, and said cladding layer having a refractive index $n_2$ of from 1.39 to 1.49; and
   a coating layer formed on said optical fiber element, said coating layer comprising a saturated higher fatty acid and a colorant, and said coating layer having a refractive index $n_3$ lower than at least the refractive index $n_2$ of said cladding layer, the refractive index $n_3$ of said coating layer being 1.40 to 1.43.

4. An optical fiber according to claim 3 wherein said refractive indices $n_1$, $n_2$, and $n_3$ satisfy a condition $n_1 > n_2 > n_3$.

5. An optical fiber, disposed in an insertion section of an endoscope to transmit an illumination light, said optical fiber comprising:
   an optical fiber element having a core layer and a cladding layer formed on said core layer, said core layer being made of a plastic material, said core layer having a refractive index $n_1$ of from 1.49 to 1.59, and said cladding layer having a refractive index $n_2$ of from 1.39 to 1.49; and
   a coating layer formed on said optical fiber element, said coating layer comprising a saturated higher fatty acid and a colorant, and said coating layer having a refractive index $n_3$ lower than at least the refractive index $n_2$ of said cladding layer, the refractive index $n_3$ of said coating layer being 1.40 to 1.43.

6. An optical fiber according to claim 5, wherein said refractive indices $n_1$, $n_2$, and $n_3$ satisfy a condition $n_1 > n_2 > n_3$.

7. An optical fiber, disposed in an insertion section of an endoscope to transmit an illumination light, said optical fiber comprising:

an optical fiber element having a core layer and a cladding layer formed on said core layer, said core layer being made of a multi-component glass, and said cladding layer having a refractive index of from 1.48 to 1.54; and a coating layer formed on said optical fiber element, said coating layer having a refractive index lower than at least the refractive index of said cladding layer, the refractive index of said coating layer being 1.40 to 1.43.

8. An optical fiber according to claim 7, wherein:
said core layer, said cladding layer, and said coating layer have refractive indices of $n_1$, $n_2$, and $n_3$, respectively; and wherein
a condition $n_1 > n_2 > n_3$ is satisfied.

9. An optical fiber, comprising:
an optical fiber element having a core layer and a cladding layer formed on said core layer; and
a coating layer formed on said optical fiber element;
said coating layer comprising at least one of a saturated higher fatty acid represented by general formula (1) given below and an alkylpolysiloxane represented by general formula (2) given below:

$$C_nH_{2n+1}COOH \qquad (1)$$

where:
n is 9, 11, 13, 15, 17 or 19;

where:
n is an integer larger than 1;
$R_1$ is a $C_{1\text{-}7}$ lower alkyl group; and
$R_2$ is hydrogen, a $C_{1\text{-}7}$ lower alkyl group, or an aryl group having about 6 carbon atoms.

10. An optical fiber according to claim 9, wherein:
said core layer, said cladding layer, and said coating layer have refractive indices of $n_1$, $n_2$, and $n_3$, respectively; and wherein
a condition $n_1 > n_2 > n_3$ is satisfied.

* * * * *